United States Patent [19]

Daniels

[11] Patent Number: 4,500,001
[45] Date of Patent: Feb. 19, 1985

[54] PALLETIZING PROCESS AND A PRODUCT OF THAT PROCESS

[76] Inventor: Frank J. Daniels, P.O. Box 518, Rexburg, Id. 83440

[21] Appl. No.: 555,164

[22] Filed: Nov. 25, 1983

[51] Int. Cl.³ .............................................. B65D 21/00
[52] U.S. Cl. ...................................... 206/597; 53/436; 206/83.5; 206/386; 206/442; 206/503; 414/907
[58] Field of Search .................. 53/436, 446; 100/255; 206/83.5, 386, 442, 497, 499, 503, 595–600; 414/31, 907

[56] References Cited

U.S. PATENT DOCUMENTS

| | | | |
|---|---|---|---|
| 1,235,094 | 7/1917 | Barker | 100/255 |
| 2,655,271 | 10/1953 | Cole | 414/62 |
| 2,675,928 | 4/1954 | Slater | 414/62 |
| 2,774,490 | 12/1956 | Strong | 206/503 |
| 2,813,638 | 11/1957 | Miller | 414/62 |
| 3,040,653 | 6/1962 | Neitzel | 100/255 |
| 3,059,787 | 10/1962 | Forsythe | 414/62 |
| 3,099,952 | 8/1963 | Dixon et al. | 100/255 |
| 3,164,408 | 1/1965 | Miller | 414/62 |
| 3,541,752 | 11/1970 | Ness | 206/499 |
| 3,556,326 | 1/1971 | Cline | 414/35 |
| 3,691,945 | 9/1972 | Guhl | 100/255 |
| 3,698,572 | 10/1972 | Dahlem et al. | 414/907 |
| 3,730,357 | 5/1973 | Beaty | 414/62 |
| 3,805,971 | 4/1974 | Behrens et al. | 414/907 |
| 3,906,591 | 9/1975 | Boiardi | 206/597 |
| 3,941,048 | 3/1976 | Oe et al. | 414/907 |
| 3,945,493 | 3/1976 | Cardinal | 206/497 |
| 3,946,883 | 3/1976 | Beal | 206/600 |
| 3,961,459 | 6/1976 | Wolske | 53/441 |
| 4,098,051 | 7/1978 | Cordes | 53/441 |
| 4,220,431 | 9/1980 | Place | 414/97 |
| 4,414,788 | 11/1983 | Berg | 206/499 |

FOREIGN PATENT DOCUMENTS 1217242 12/1959 France ............................... 206/386

Primary Examiner—George E. Lowrance
Assistant Examiner—Jimmy G. Foster
Attorney, Agent, or Firm—Mallinckrodt, Mallinckrodt, Russell & Osburn

[57] ABSTRACT

A process for dense packing on a conventional pallet three-cubic-foot bags containing a lightweight, loose material that will flow within that bag, by a stacking pattern where a pair of bags are arranged alongside and offset from one another on the pallet to make up each stack layer, with successive layers rotated ninety degrees (90°) from the layer below; applying, in turn, to each bag a downward force, as by a person moving his feet thereon, to evacuate air from that bag and to shift the contents to fill in gaps or openings in the layer below; and securing that stack to the pallet for transport; and a stack of three-cubic-foot bags containing a lightweight, loose material by a practice of the process of the invention.

11 Claims, 10 Drawing Figures

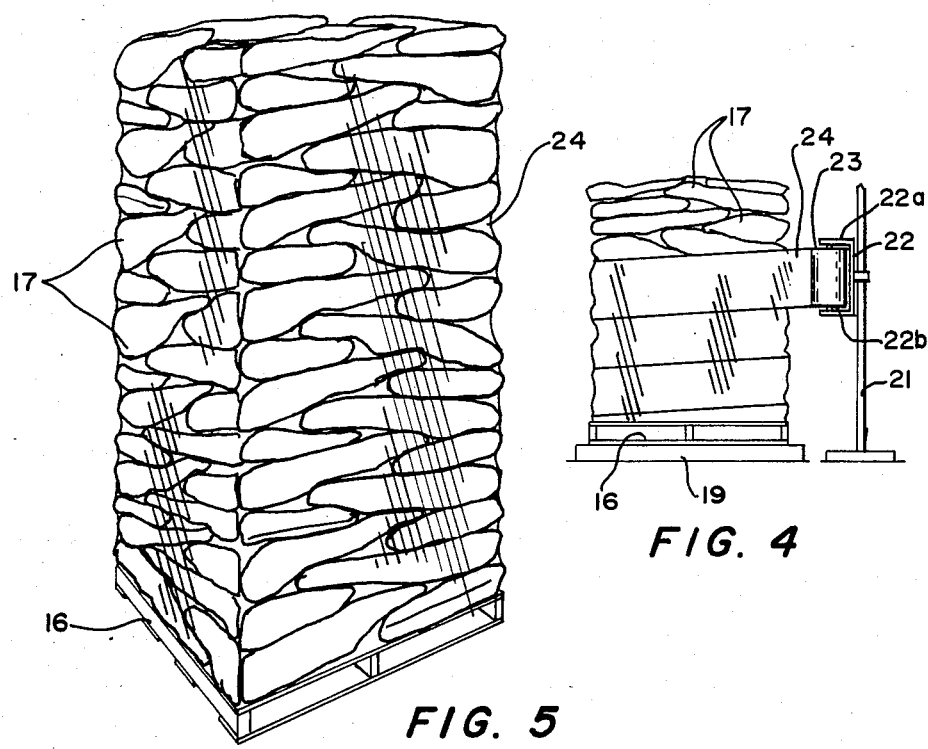
FIG. 4
FIG. 5
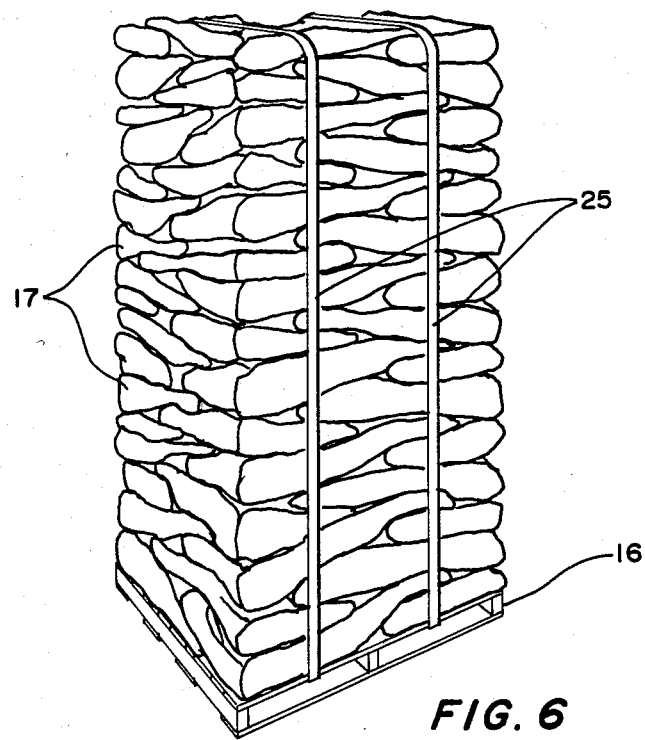
FIG. 6

PALLETIZING PROCESS AND A PRODUCT OF THAT PROCESS

BACKGROUND OF THE INVENTION

1. Field

This invention relates to a process for dense packing of bags containing lightweight material on a pallet for handling and transport.

2. Prior Art

It is, of course, a common practice to load and secure items for transport onto a standard wood pallet and move those palletized items by conventional transport. Where such items have dimensions for exactly covering the pallet, an efficient space utilization is obviously obtained. Where, however, a particular item has such dimensions that it cannot be conveniently stacked with others to fully cover a standard pallet, stacking techniques that have been employed to provide a stable stack of such items have heretofore failed to obtain an efficient space utilization. The present invention, distinct therefrom, provides for both a stable stack and an efficient space utilization. Below are cited a number of patents that include apparatus similar to that preferred for practicing steps in the palletizing process of the present invention, none of which, however, anticipate the present process.

Patents by Cline, U.S. Pat. No. 3,566,326, and Place, et al., U.S. Pat. No. 4,220,431, show cage arrangements for providing side support to sacks, boxes, or the like that are stacked onto a pallet, which sides are then removable for allowing a forklift or the like to have access to the pallet for lifting and movement thereof. These support structures are similar to that preferred for use in a practice of the process of the present invention.

Examples of apparatus and techniques for palletizing standard-sized items are shown in patents by Miller, U.S. Pat. No. 2,813,638; Wolske, U.S. Pat. No. 3,961,459; and Miller, U.S. Pat. No. 3,164,080. These patents, additional to handling of uniform items that apparently have suitable dimensions to fit exactly on a pallet, also provide a wrapping procedure, similar to that preferably employed in a practice of the present invention, for maintaining the stack of items to that pallet during handling and transport. Additionally, a patent by Cordes, et al., U.S. Pat. No. 4,098,051, shows irregular articles contained within a shrink wrap that is like that employed in a practice of the present invention.

Another arrangement for maintaining a stack of items on a pallet is shown in a patent by Forsythe, U.S. Pat. No. 3,059,787, that involves application of an adhesive in the form of a tape, having adhesive layers on both sides, between bags to hold these bags together and maintain stack integrity. This arrangement also relates to bags that fit on a uniform-sized pallet and is not directed toward a stacking technique like that of the present invention.

Earlier stacking apparatus and procedures directed toward the stacking of bags not of a size to be conveniently arranged to fill or cover a pallet have generally involved an overlapping or layering arrangement that leaves unfilled spaces or openings on each layer. Distinct therefrom, the stacking procedure of the present invention provides a stack where all the space in each layer is filled. Some such earlier arrangements that do not anticipate the dense pack stacking procedure of the present invention are shown in patents by Cole, et al, U.S. Pat. No. 2,655,271; Slater, U.S. Pat. No. 2,675,928; and Beaty, Jr. et al., U.S. Pat. No. 3,730,357.

Certain of the cited art, as outlined above, utilizes apparatus like that preferred for a practice of the process of the present invention as, for example, the use of a cage structure for stacking of items on a standard wood pallet and the preferred shrink wrap techniques for maintaining stacked items. None, however, show the unique stacking procedure of the present invention for achieving a dense stacking of bags of lightweight, loose material that are not of a shape convenient for filling or covering a standard pallet. Preferably, the present invention provides a procedure for stacking of three-cubic-foot bags or sacks of lightweight, loose material, such as redwood bark, that has characteristics of flow within the bag suitable for filling in open areas between layers of such bags or sacks.

SUMMARY OF THE INVENTION

It is, therefore, a general object of the present invention to provide a procedure for dense packing, onto a standard wood pallet, of three-cubic-foot bags, approximately 24 inches in width and 38 inches in length, that contain a lightweight, loose material that, when vertical pressure is applied thereto, will flow within the bag to fill in openings or spaces between the bags on the layer below, producing a dense columnar stack, and securing that stack to the pallet for transport.

Another object of the present invention is to provide a procedure for densely packing stacks of bags containing loose material, such as redwood bark, that involves forcing, by application of vertical pressure, air from those bags and causing the bagged materials to flow into the openings and spaces in the layer of bags immediately below.

Still another object of the present invention is to provide a procedure for dense stacking of bags containing lightweight, loose material on a standard pallet to achieve a stable, uniform, layered stack, and for appropriately maintaining that stack together on that pallet for shipment and transport.

Still another object of the present invention is to provide a densely packed, layered stack of three-cubic-foot bags containing a lightweight, loose material for storage and transport by a practice of the process of the present invention.

In accordance with the above objects, the present invention is in a process for forming a stable, uniform, layered, dense stack of, preferably, three-cubic-foot bags that contain a lightweight, loose, flowing material, such as redwood bark, and stabilizing and securing that stack to a standard pallet for transport and storage. The invention is also in the densely packed, layered stack of three-cubic-foot bags containing a lightweight, flowing material maintained to a standard pallet, as formed by a practice of the process of the present invention.

The process of the present invention is preferably practiced for stacking, the three-cubic-foot bags that contain a lightweight, loose, flowing material on a conventional standard wood pallet and securing those bags thereon, to forming a dense pack of bags that will be stable during transport. Such bags have empty dimensions usually of 24 inches in width and 34 inches in length, and when full, have lesser dimensions. When such filled bags are conventionally cross-stacked in layers on a standard pallet that is approximately 40 inches by 48 inches, the bag length will not cover the pallet from side to side on either the short or long sides, leaving a gap or opening of from two to ten inches between each bag end and a pallet side, with the bag width extending beyond the pallet edge on the short side and approximately to the pallet center on the other side. In the past, in order to provide a uniform, stable stack of such bags, a cross-stacking technique has been used where the bags overlap or span gaps or openings in the layer below. Pockets are thereby left in each layer, losing valuable space and limiting the number of bags that can be stacked on a single pallet. Failure to utilize all the space available for a given stack height limits the amount of materials that can be hauled, as by truck or rail, as, even densely packed, the weight of a truckload of such materials will generally not exceed a load weight limit. Unique therefrom, the present invention provides a stacking procedure whereby the filled bags are emptied of air and the loose materials contained therein are encouraged to flow into and fill gaps or openings between bags in a layer below. The present invention includes both a stacking procedure and a procedure for causing such air evacuation and flow, providing a dense packing of the preferred three-cubic-foot bags to a desired stack height.

The dense packing of three-cubic-foot bags on a pallet is preferably practiced within a cage structure, wherein a pallet is first positioned, the cage having two parallel side walls and a rear wall and being open across a front face. The cage dimensions are such that the pallet sides will fit along the side and rear walls, with the pallet resting on the cage floor. The side walls are held together by stretching a chain, or the like, across the cage open face, which chain is releasable after the stack has been built.

In building the stack, the three-cubic-foot bags are layered in pairs, a first pair positioned on the pallet with the bags offset from one another, the bag ends spaced apart from opposite pallet edges, leaving an open area between each bag end and a pallet edge, the bag width either aligning with or overlapping the adjacent pallet edges. The next layer of bags is formed by placing a second pair of bags on the first, the bags also offset from one another, and rotated ninety degrees (90°) from that first pair making up the layer below. The loose material contained within the bags of that second layer is then encouraged to flow into the spaces or openings in the first layer therebelow. This flow is accomplished by the positioning of a person within the cage, who, by moving his feet on the individual bags, forces air out of the bags and shifts the loose materials therein to fill gaps and openings in the layer below. This stacking process is continued, with the bags of each pair offset from one another and rotated ninety degrees (90°) with respect to the layer below, until the desired stack height is achieved. When the stack is at a desired height, the chain is released and a cage sidewall is swung back, allowing a forklift, or the like, to have access to the pallet to lift and move it to a shrink wrap table. Thereat, a stretched plastic shrink wrap is preferably applied around the bags and the pallet to hold the bags in place on that pallet. Alternatively, the bags can be adhesively secured one to another by adhesive strips or by application of a liquid adhesive between the bag surfaces that dries to hold the bags together, or bands can be secured around the bags and through the pallet, and cinched tight therearound, to hold the stack together.

BRIEF DESCRIPTION OF THE DRAWINGS

In the drawings that show that which is presently regarded as the best mode for carrying out the invention:

FIG. 4 shows the pallet stacked with bags positioned on a rotating table, and shows a plastic wrap being installed therearound;

FIG. 5 is a perspective view of a stacked pallet enclosed by a transparent wrap;

FIG. 6 is a view like that of FIG. 5, showing the stack maintained by continuous bands vertically encircling the bags and fitted through pallet openings.

DETAILED DESCRIPTION OF THE DRAWINGS

Figure 1:
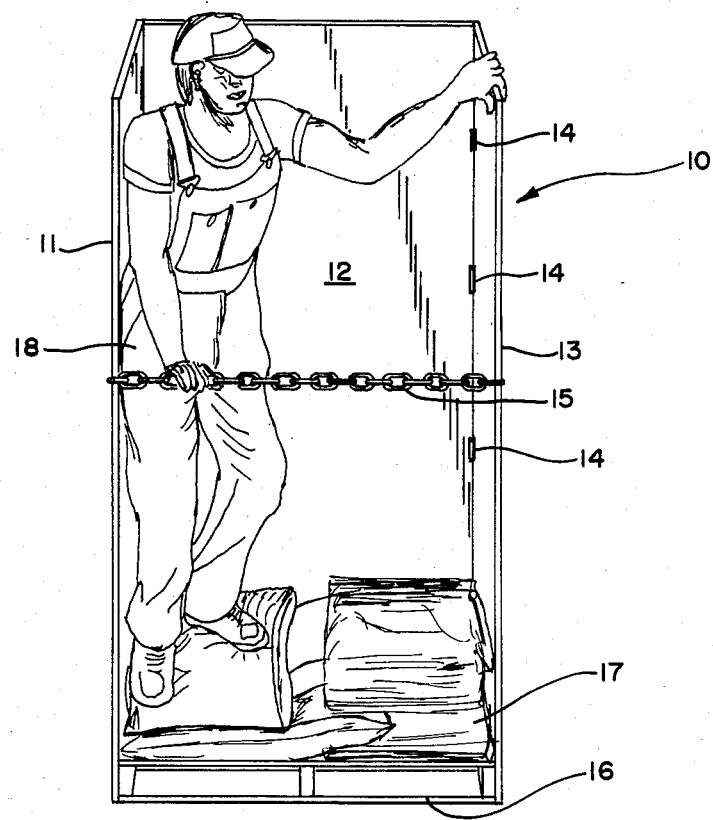
FIG. 1 is a front elevation view of a cage, wherein is positioned a pallet, and shows a worker standing on a second layer of bags that have been positioned on the pallet, the worker, with his feet, pressing air from the bags and causing a flow of the loose material therein into gaps or openings between bags in a first layer.
Figure 2:
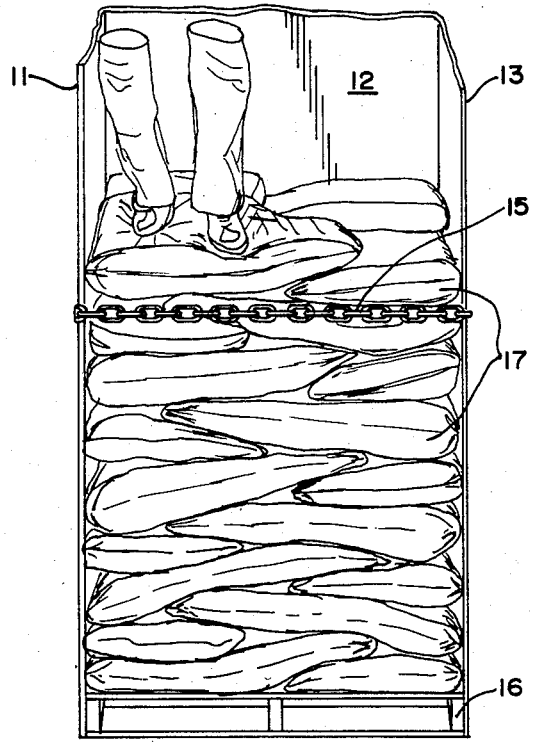
FIG. 2 is like FIG. 1, and shows a higher stack of layers of bags, the worker's legs shown stepping on the bags.

FIG. 1 shows a view of a loading frame or cage 10 that includes fixed side wall 11 that is secured edge-to-edge to a fixed rear wall 12, the walls extending at a ninety degree (90°) angle to one another, with a third side wall 13 connected edge-to-edge by hinges 14 to rear wall 12 to pivot therearound. A chain 15 is shown connected between the side walls for maintaining the parallel spacing arrangement thereof. A pallet 16 is shown arranged within the cage, between the side walls, and stacked with first and second layers of bags 17 that contain a lightweight, loose material. A worker 18 is shown standing on one of the bags, moving his feet thereon, to force air out of that bag and to shift the bag contents to fill gaps and openings between the bag ends and the pallet edge proximate thereto in the first layer therebelow. Preferably, the process of the invention is practiced on bags formed of a flexible material, such as plastic, that have a capacity for containing three cubic feet of material therein and are approximately 24 inches in width and 38 inches in length when empty, and when full, are of somewhat lesser dimensions. Preferably, the loose material contained in each bag is such that it will exhibit fluid characteristics, such as would redwood bark chips. Such bagged material, when a worker moves his feet thereon, will flow into gaps or openings in the layer below, and air will be expelled from the bag. In practice, the bags are stacked layer on layer, the worker 18 leveling the bags in each layer by treading thereon, and encouraging the contents in each to fill in the gaps or openings in the layer below. The combination of expelling the air from each bag and causing the flow of the contained loose materials provides a maximum stack density, as also illustrated in FIG. 2.

Figure 3:
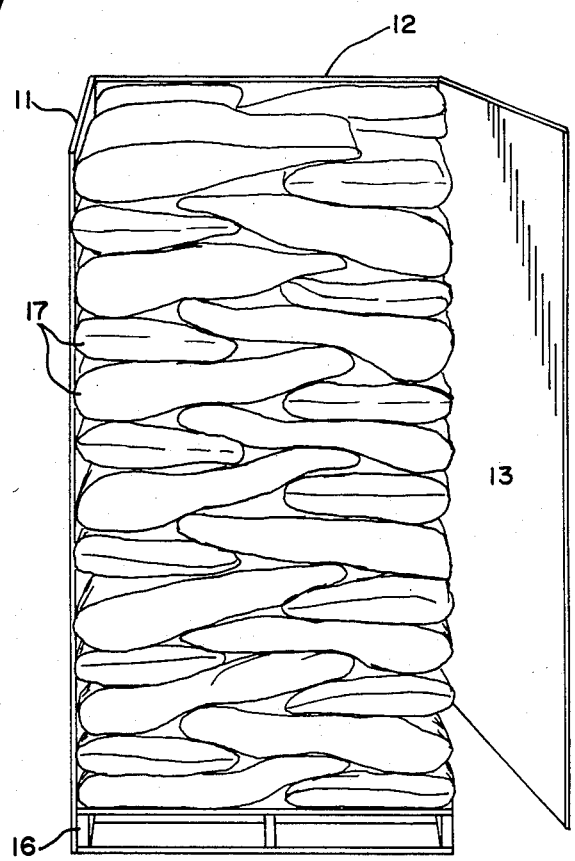
FIG. 3 shows the pallet with a completed stack of bags thereon, and shows a cage side wall swung open to facilitate the removal of a palletized stack.

In FIG. 3 is shown a completed stack of bags 17, with cage side wall 13 pivoted back from the completed stack on its hinge connection to the edge or rear wall 12 after the chain 15 has been removed. The stacked pallet can then be removed to a wrapping table like that shown in FIG. 4, using a forklift or like lifting device, not shown. A preferred wrapping table includes a table or platform 19, whereon the loaded pallet 16 is positioned. The table 19 is supported on bearings, not shown, to carousel or rotate through 360°. Next to the table is arranged a base 20 wherefrom a standard 21 extends vertically. The standard 21 is at approximately a ninety degree (90°) angle to the table, and supports a trolley 22 for vertical movement thereon. The trolley 22 includes bracket ends 22a and 22b for fitting into the respective open ends of a roll 23, whereon is wound a sheet of material 24. In practice, the pallet 16, with bags 17 stacked thereon, is positioned on the table 19, with the trolley 22 in a lowermost position. Thereafter, the wrap, preferably plastic, is secured at its end to the stack and pallet, and the table is pivoted. As the stack is turned, the wrap 24 that feeds from the roll 23 is preferably stretched as it wraps that stack, with that trolley moving upwardly an increment of distance for each rotation, to wrap the stack over its entire height. Trolley vertical movement can be accomplished either manually or mechanically, with the trolley linked to the table such that a table revolution will move the trolley an appropriate increment of vertical distance. The wrap is thereby continuously wound around the stack until a top-most point on the stack is reached. Thereat, the wrap can be cut and fixed as by application of heat to the wrap end, securing it to the stack. The plastic wrap that is stretched as it is wound around the stack is thereby shrunk to closely fit to the stack. This stretching can be accomplished by application of a tensil stress or pull to the wrap as it is wound off the roll 23, or by application of heat as by passing it over a hot air source during the wrapping, or the like. The wrap is thereby stretched during application and will shrink to closely fit around the stack. This is commonly known as a shrink wrap machine and has been found to satisfactorily secure the stack of bags to the pallet. In practice, a shrink wrap machine manufactured by Lantech has been found to operate satisfactorily for securing the stacked bags to a pallet, although other apparatus that function similarly could obviously be used within the scope of this disclosure.

FIG. 6 shows another arrangement for securing the stack of bags 17 to pallet 16 that involves fitting at least two straps 25 over and around the bags and through the pallet openings, which bands are then cinched or tightened and the band ends secured together as continuous bands, maintaining the stack of bags to pallet 16. Also, the bags could be arranged to be self-supporting as by applying an adhesive coating, adhesive tape, or the like to the top surface of each bag as it is stacked, that adhesive bonding to the undersurface of a bag stacked thereon. Such arrangement is not shown, but should be understood to be within the scope of this disclosure.

Figure 7A:
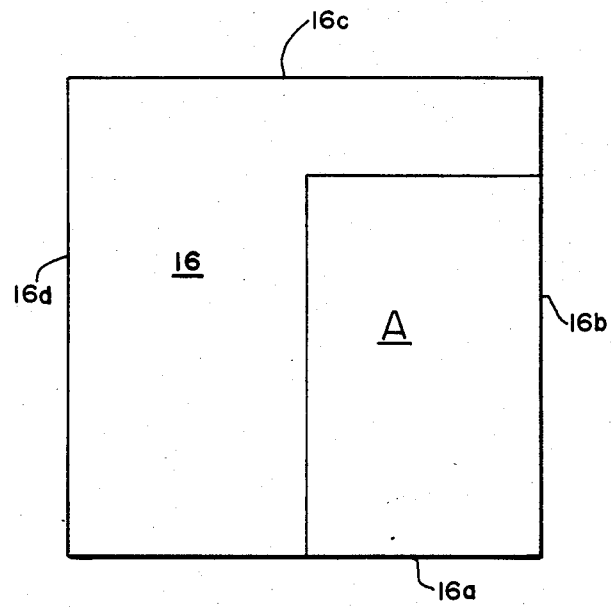
FIGS. 7(a-d) show placement of lettered bags in offset pairs on a pallet, forming the first two layers of a stack.
Figure 7B:
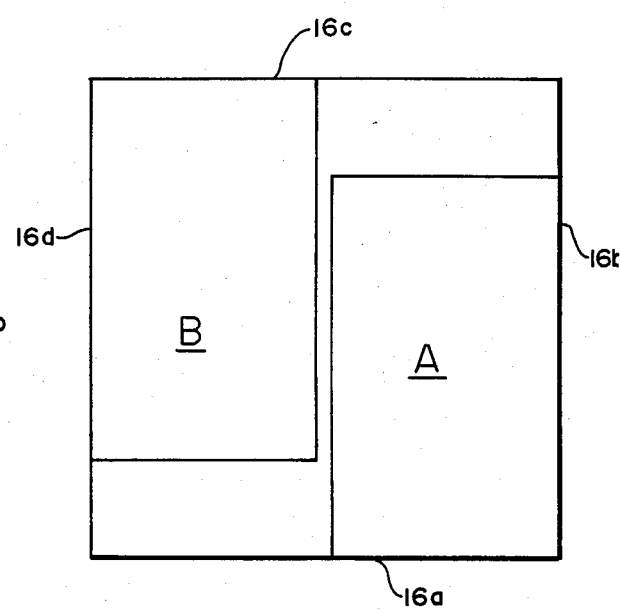
Figure 7C:
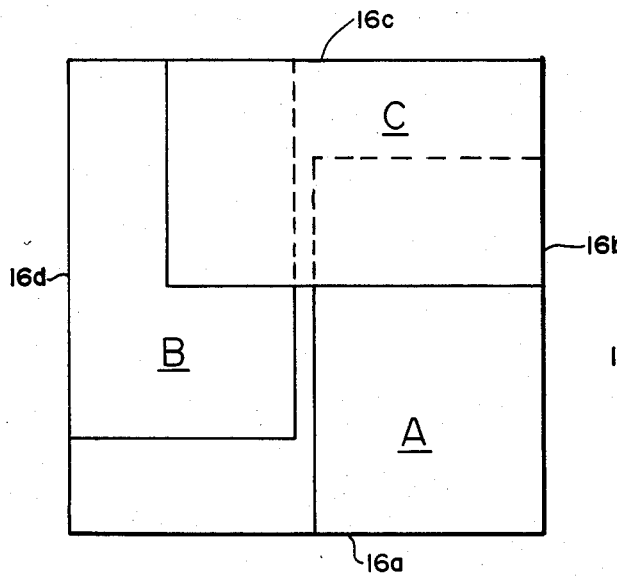
Figure 7D:
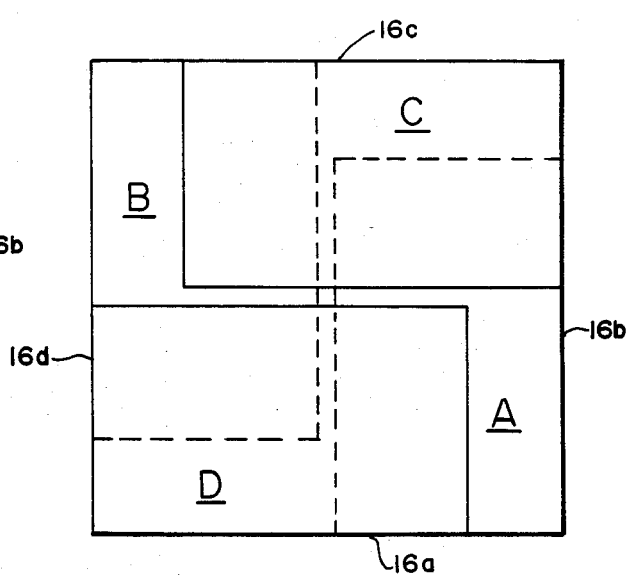

FIGS. 7(a) through 7(d) are included to illustrate a preferred bag stacking procedure for practicing the process of the present invention. FIG. 7(a) shows a top view of pallet 16 whereon a first filled bag, labeled A, is positioned, the end thereof extending from a lower right-hand corner along a pallet edge 16a to a point that is less than the pallet center, with the bag A side shown lying along a pallet edge 16b, terminating back from a pallet edge 16c. The three-cubic-foot bag filled dimensions will be less than the empty dimensions of approximately 24 inches in width and 38 inches in length, and so will be less than half the pallet long side dimension and will extend slightly over the edge of the pallet short side when arranged alongside another bag. The bag positioned lengthwise on the 40-inch-by-48-inch pallet will, therefore, have gaps for both pallet short and long sides from the bag end to a pallet edge shown in FIG. 7(a) as pallet edge 16c. Shown in FIG. 7(b) is a next filled bag B that is the second of the pair of bags that make up the stack first layer. Bag B is shown positioned offset from bag A, its end resting along the pallet edge 16c and its side positioned along a pallet edge 16d, leaving a gap or opening at pallet edge 16a. Thereby, the two bags will be offset from one another at their ends and will be approximately together along their inner sides or edges, leaving gaps or openings between the respective bag ends and the opposite pallet edges. As shown in FIG. 7(c), a next stack layer is formed with a pair of filled bags C and D that, like bags A and B, are offset from one another, rotated ninety degrees (90°) with respect to that first pair, and positioned thereon. Bag C is positioned with its end aligned along pallet edge 16b, and its side along pallet edge 16c. Bag C thereby rests partially on bag A and covers the gap or opening between it and pallet edge 16c, the contents of bac C can thereby flow within the bag into and fill in that gap or opening when the worker treads on that bag. A gap or opening is thereby left in the second layer or level between the end of bag C and the pallet edge 16d. This gap or opening is filled when the next layer is laid thereon. Next, as shown in FIG. 7(d), a second bag D of the pair of bags C and D is positioned so as to be offset to bag C, its end positioned along pallet edge 16d and covering portions of bag A, leaving a gap or opening between the bag end and pallet edge 16b that is filled in by installing the next layer thereon, as described.

The subsequent layers are formed by pairs of bags, as described above, each bag within a pair offset with respect to the other and the pair rotated ninety degrees (90°) with respect to the layer therebelow. As the bags are so layered on one another, the worker 18, as illustrated in FIG. 1, by moving his feet on each bag in turn, causes air to be expelled from that bag and the loose contents to flow within the bag, filling the gaps and openings in the layer below, providing thereby a dense packing of each layer, one on the other. A minimum layer thickness is thereby achieved, maximizing the number of bags that can be stacked to a certain stack height. In practice, it has been found that with the stacking method of the present invention, a stack produced thereby will have approximately eleven layers of two bags per layer, for a total of twenty-two bags, and weigh approximately nineteen hundred pounds (1900 lbs.). Whereas, by stacking the bags parallel to one another, leaving gaps or openings therebetween that are not filled in with two bags for one layer followed by one bag on the next layer, and without venting air from the bags, a same height of stack will have one less layer, for a total of fifteen bags, and weigh approximately thirteen hundred pounds (1300 lbs.). The present invention, therefore, provides by a practice thereof for an increase of seven bags per stack.

Herein has been described the preferred stacking procedure for erecting a dense pack of three-cubic-foot bags containing lightweight, loose, flowing materials on a conventional pallet to a certain height. While a certain cage structure and wrap arrangement have been shown herein as preferred for use in building the stack, it should be understood that other arrangements for use as described are possible within the combination without departing from the subject matter coming from the scope of the following claims, which claims I regard as my invention.

I claim:

1. A process for high density stacking of three-cubic-foot bags containing a lightweight, loose material on a standard pallet where a layer consists of a pair or bags laid side by side to leave open areas therebetween and to the pallet sides consisting of positioning a standard pallet within an arrangement for laterally supporting bags as they are stacked on said pallet;

positioning on that pallet, as a first layer, a pair of bags offset from and alongside one another leaving open areas therebetween with opposite bag corners aligning with opposite pallet corners;

positioning on that pallet, as a second layer, a pair of bags offset from and alongside one another and rotated ninety degrees (90°) from said first layer with opposite bag corners aligned with opposite pallet corners, portions of the bags of said second layer positioned over to fill in said open area between said bags and the pallet sides of said first layer;

positioning on that pallet, as subsequent layers to a desired stack height, pairs of bags offset from and laid alongside one another and each pair rotated ninety degrees (90°) from the layer below the opposite corners of the bags of each layer aligned with opposite pallet corners and filling in said open areas between said bags and the pallet sides of said layer below;

applying vertical pressure on each said bag in turn to force air out from the bag interior and to cause the materials therein to flow into open areas in the layer of bags below said bag; and securing the stack of bags to the pallet.

2. A process as recited in claim 1, wherein the arrangement for laterally supporting the bags is a cage structure having upstanding side and rear walls rigidly secured together along their respective edges with a second side, all connected by a hinge arrangement to said other rear wall edge to pivot therearound, said side and rear walls forming a U that is open on a forward face to receive the pallet positioned therein to fit closely against the pallet sides; and includes a means for maintaining said sidewalls essentially parallel.

3. A process as recited in claim 1, wherein the bags are formed from a flexible plastic; and the lightweight, loose material contained in the bags is redwood bark chips.

4. A process as recited in claim 1, wherein vertical pressure is applied to each bag in turn by a person standing and moving his feet thereon.

5. A process as recited in claim 1, wherein the bags are secured to the pallet by installation of a plastic wrap stretched therearound.

6. A process as recited in claim 1, wherein the bags are secured to the pallet by bands vertically encircling the stacked bags and threaded through longitudinal openings in the pallet with each formed into a continuous band.

7. A palletized stack of bags of lightweight, loose material where the individual bags are three-cubic-foot bags that have outside dimensions such that, when a pair of bags is laid alongside and offset to one another on the standard pallet there will be open areas between the bags and to the pallet sides comprising, a standard pallet;

a stack of three-cubic-foot bags, each containing a lightweight, loose material, arranged on said pallet to a desired height, the bags stacked in pairs, with the bags in a first pair to form a first layer laid alongside and offset from one another on said pallet leaving open areas therebetween with opposite bag corners aligning with opposite pallet corners, with second and subsequent layers formed with a second pair and subsequent pairs of bags that are also laid alongside and offset from one another, each pair rotated ninety degrees (90°) with respect to the pair below, with opposite bag corners of each pair aligned with opposite pallet corners and filling in said open areas in the layer below, each bag, in turn, having a vertical pressure applied thereon to evacuate air and to cause a flow of the loose materials within said bag to fill into said openings in the layer below; and means for securing the stack of bags to said pallet.

8. A palletized stack of bags of lightweight, loose material as recited in claim 7, wherein the bags are formed of plastic and, when empty, are approximately twenty-four (24) inches in width and thirty-eight (38) inches in length and contain, as the lightweight, loose material, redwood bark chips.

9. A palletized stack of bags of lightweight, loose material as recited in claim 7, wherein vertical pressure is applied on each bag, in turn, by a person standing and moving his feet thereon.

10. A palletized stack of bags of lightweight, loose material as recited in claim 7, wherein the means for securing the stack of bags to said pallet consists of a plastic wrap stretched to wrap around the stack of bags and pallet.

11. A palletized stack of bags of lightweight, loose material as recited in claim 7, wherein the means for securing the stack of bags to said pallet consists of bands vertically encircling the stack and each threaded through a longitudinal opening in the pallet, tightened therearound, and joined into a continuous band.

* * * * *